(12) United States Patent
Ha et al.

(10) Patent No.: US 7,543,577 B2
(45) Date of Patent: Jun. 9, 2009

(54) LOW-FUEL CONSUMPTION AND LOW POLLUTION COMBUSTION SYSTEM FOR SUPPLYING VEHICLE ENGINE WITH MIXTURE OF FUEL AND OXYGEN

(75) Inventors: Yeonggil Ha, Gyeongaangbuk-do (KR); Yunha Kim, Incheon (KR)

(73) Assignee: Korea Environment Technology Co., Ltd., Incheon (KR)

( * ) Notice: Subject to any disclaimer, the term of this patent is extended or adjusted under 35 U.S.C. 154(b) by 0 days.

(21) Appl. No.: 11/663,232

(22) PCT Filed: Sep. 16, 2005

(86) PCT No.: PCT/KR2005/003099

§ 371 (c)(1),
(2), (4) Date: Mar. 19, 2007

(87) PCT Pub. No.: WO2006/033542

PCT Pub. Date: Mar. 30, 2006

(65) Prior Publication Data

US 2007/0266995 A1    Nov. 22, 2007

(30) Foreign Application Priority Data

Sep. 20, 2004    (KR) ...................... 10-2004-0075205

(51) Int. Cl.
*F02B 23/00* (2006.01)
*F02M 23/00* (2006.01)
(52) U.S. Cl. ...................................... 123/585; 123/587
(58) Field of Classification Search ................. 123/567, 123/585, 587, 184.33, 184.41, 543, 545, 123/552, 556
See application file for complete search history.

(56) References Cited

U.S. PATENT DOCUMENTS

| | | | | |
|---|---|---|---|---|
| 5,649,517 A * | 7/1997 | Poola et al. | ................. | 123/585 |
| 5,678,526 A * | 10/1997 | Cullen et al. | ................ | 123/690 |
| 5,960,777 A * | 10/1999 | Nemser et al. | .............. | 123/585 |
| 6,055,808 A * | 5/2000 | Poola et al. | ................... | 60/274 |
| 6,067,973 A * | 5/2000 | Chanda et al. | .............. | 123/585 |

(Continued)

FOREIGN PATENT DOCUMENTS

JP    07-004325    1/1995

(Continued)

*Primary Examiner*—Stephen K Cronin
*Assistant Examiner*—Sizo B Vilakazi
(74) *Attorney, Agent, or Firm*—Muncy, Geissler, Olds & Lowe, PLLC (57) ABSTRACT

A low-fuel consumption and low-pollution combustion system supplies an engine with a mixture, in which oxygen contained in air is separated from nitrogen through a PSA (pressure swing adsorption) whereby oxygen having purity above 95% and a fuel mixture is fed into and burned in the combustion chamber obtaining a desired engine output with low-fuel consumption. Nitrogen is previously removed so that nitride oxide can be minimized during combustion procedure and CO and toxic gas derived from incomplete combustion can be minimized. The system obtains high engine output and low-fuel consumption by reducing toxic gas derived from incomplete combustion. The system includes an oxygen separator for separating oxygen from nitrogen by introducing external air into adsorption towers with predetermined pressure while storing the oxygen separated from the nitrogen in an oxygen storage tank and exhausting the nitrogen.

6 Claims, 3 Drawing Sheets

U.S. PATENT DOCUMENTS

| | | | |
|---|---|---|---|
| 6,176,897 B1 * | 1/2001 | Keefer | 95/98 |
| 6,289,884 B1 * | 9/2001 | Blandino et al. | 123/585 |
| 6,352,068 B1 * | 3/2002 | Jacobsen | 123/585 |
| 2004/0055585 A1 * | 3/2004 | Smolarek et al. | 123/585 |

FOREIGN PATENT DOCUMENTS

| | | |
|---|---|---|
| KR | 1020030081192 A | 10/2003 |

* cited by examiner

LOW-FUEL CONSUMPTION AND LOW POLLUTION COMBUSTION SYSTEM FOR SUPPLYING VEHICLE ENGINE WITH MIXTURE OF FUEL AND OXYGEN

TECHNICAL FIELD

The present invention relates to a low-fuel consumption and low-pollution combustion system for supplying a vehicle engine with a mixture of fuel and oxygen. More particularly, the present invention relates to a low-fuel consumption and low-pollution combustion system for supplying a vehicle engine with a mixture of fuel and oxygen, in which oxygen contained in air is separated from nitrogen through a PSA (pressure swing adsorption) scheme so that oxygen having purity above 95% is obtained and a mixture of fuel and oxygen is fed into a combustion chamber of the vehicle engine and burned in the combustion chamber of the vehicle engine, thereby obtaining a desired engine output with low-fuel consumption, and in which nitrogen ($N_2$) is previously removed so that an amount of nitride oxide (Nox) can be minimized during the combustion procedure and CO and toxic gas derived from incomplete combustion can be minimized by achieving complete combustion.

BACKGROUND ART

In general, an engine includes a piston, a connecting rod, and a crankshaft. The piston is linearly reciprocated in a cylinder under the airtight condition and the linear movement of the piston is converted into a rotational movement of the crankshaft through the connecting rod.

Chemical energy of fuel is converted into heat energy (pressure of gas) through combustion in a mixer and expansion pressure of gas pushes the piston downward while rotating the crankshaft, thereby generating mechanical energy (power) for performing work.

Current combustion technologies of the vehicle generate a great amount of exhaust gas, thereby causing environmental pollution.

The exhaust gas signifies gas exhausted to the exterior through an exhaust pipe after it has been burned in the cylinder. The exhaust gas mainly consists of harmless materials, such as $H_2O$, $N_2$ and $CO_2$. However the exhaust gas also includes harmful materials, such as CO, HC, Nox, lead oxides and carbon particles.

Herein, CO, HC and Nox relate to environmental pollution so that it is necessary to reduce the content of CO, HC and Nox.

Blow-by gas is introduced into a crankcase by passing through a gap formed between the piston and the cylinder, so it is called "crankcase emission". The blow-by gas mainly consists of unburned HC (70 to 95%). The remaining portion of the blow-by gas is a mixture including combustion gas and partially oxidized gas.

If the blow-by gas exists in the crankcase, an internal wall of the engine is eroded and the quality of engine oil is degraded. For this reason, the blow-by gas is conventionally exhausted to the exterior through ventilating the crankcase. However, since the exhausted blow-gas contains a relatively large amount of HC, an apparatus for purifying HC is separately provided.

CO is colorless and odorless gas generated when fuel is incompletely burned. If CO is absorbed in a human body, CO may be mixed with hemoglobin carrying oxygen in a bloodline, so that oxygen may not be sufficiently fed into each part of the human body. If an amount of CO absorbed in the human body exceeds a predetermined level, a CO-addiction may occur.

In general, if people stay for one hour under the environmental condition of air containing 0.15% of CO, the life of these people may become threatened. This has been proven through the CO-addiction caused by CO generated from a briquette used at home.

Compounds consisting of carbon C and hydrogen H are called "hydrocarbon". HC is contained not only in the exhaust gas, but also in the blow-by gas or fuel evaporation gas. From among HC exhausted to the exterior from the vehicle, about 60% of HC is exhausted through the exhaust pipe, about 25% of HC is exhausted through the crankcase as a blow-by gas, and about 15% of HC is exhausted as an evaporation gas.

HC having low density may slightly stimulate respiratory organs of the human. However, in an extreme case, the HC may harm a mucous membrane or eyes of the human.

Since nitride compounds include NO, $NO_2$, $N_2O$, etc., they are called "Nox". Air includes 79% of nitrogen, so that the nitrogen cannot be easily oxidized even if stable combustion is performed. When the nitrogen makes contact with air in the combustion chamber under the high temperature and pressure condition, the nitrogen is oxidized, thereby forming the Nox. The Nox harms eyes of people and degrades the function of the lungs while causing the photochemical smog. The smog is a compound word of "smoke" and "fog". The exhaust gas contains nitride compounds including 95% of $NO_2$ and 3-4% of NO.

Hydrocarbon or nitride oxide exhausted from vehicles, factories or power plants may not directly form the photochemical smog. That is, the photochemical smog is formed when the hydrocarbon or nitride oxide repeats the photochemical reactions in the atmosphere with strong solar light (ultraviolet ray). At this time, materials exerting the bad influence upon eyes or respiratory organs of the human are secondarily created in the form of the smog.

In general, $(PB(CH_3)_4)$ or $(PB(C_2H_5)_4)$ is added to gasoline for the vehicles in order to obtain a high octane level, so lead compounds are detected from the exhaust gas of the vehicle. Since $(PB(CH_3)_4)$ and $(PB(C_2H_5)_4)$ are toxic materials, if the $(PB(CH_3)_4)$ exhausted in the form of oxidized lead through the combustion procedure is absorbed in the human body through air, the respiratory organs and muscular system of the human may be damaged. For this reason, lead-free gasoline having no $(PB(CH_3)_4)$ is currently fed to the engine of the vehicle.

Preferably, a theoretical mixture ratio (14.7 weight percent of air:1 weight percent of fuel) presenting the highest combustion efficiency, an economical mixture ratio (16 weight percent of air:1 weight percent of fuel) and a maximum output mixture ratio (12.5 weight percent of air:1 weight percent of fuel) are used as a mixture ratio for a high-performance engine.

The above mixture ratios are suitable for improving engine performance and the combustion speed may significantly vary depending on the mixture ratios. There exist the following relationships between the mixture ratio and an amount of toxic gas contained in exhaust gas.

1. An amount of Nox is reduced and an amount of HC is increased in a rich mixture.
2. An amount of CO and HC is reduced and an amount of Nox is increased in a lean mixture.
3. An amount of Nox and CO is reduced and an amount of HC is increased in a super lean mixture.

Regarding the relationship between the engine temperature and toxic gas, if the engine has a low temperature, fuel cannot be easily atomized and the mixture makes contact with a cooled intake manifold or a cylinder wall so that a part of gasoline is coagulated in a liquid state or a particle sate. Thus, a rich mixture is employed when the engine has the low temperature. In this case, an amount of air in the mixture is insufficient so that CO is generated. In addition, since the combustion temperature is lowered, an amount of Nox is reduced and an amount of unburned HC is increased.

In contrast, if the engine has a high temperature with cooling water having a temperature of 89 to 90° C., evaporation of fuel is promoted so that the engine can be economically operated. However, if the engine has an excessively high temperature, various problems, such as overheat, detonation or pre-ignition, may occur. Thus, the combustion temperature may excessively rise, so that an amount of Nox may increase.

In a case of sudden deceleration, a throttle valve is rapidly closed so that strong vacuum is instantly created in the manifold. As a result, an amount of intake air is reduced and an amount of gasoline is increased, thereby causing a super rich mixture ratio while lowering compression pressure of the cylinder.

For this reason, the combustion temperature is lowered, an amount of CO is increased due to incomplete combustion and an amount of HC is increased because a quenching zone is formed.

A wall of a combustion chamber having a relatively low temperature, a crevice volume formed between a cylinder and a piston and a small gap formed in a valve may not be influenced by flames so that incomplete combustion may occur in the above areas. Such an incomplete combustion area is called a "quenching zone".

Regarding the relationship between engine load and toxic gas, if the engine operates with a low speed, the engine idly rotates to drive the vehicle with a reduced speed. In addition, if the engine operates with a low speed and low load, the mixture becomes rich, compression pressure of gas becomes reduced, and the combustion speed of the mixture becomes lowered. Accordingly, CO is generated due to reduced pressure and incomplete combustion. In addition, since the gas temperature is lowered, the quenching zone is thickly formed, thereby generating HC. Therefore, the toxic gas is exhausted even if the engine normally operates with low load.

When the engine operates with a low speed, a part of the mixture is uselessly exhausted upon a valve overlap, thereby generating HC.

In contrast, when the engine operates with high load, advanced timing is employed so that the gas temperature rises, thereby improving the combustion efficiency. However, this may cause creation of HC although an amount of CO is relatively reduced.

In order to purify the toxic exhaust gas, a catalytic converter has been proposed. According to the catalytic converter, a mixture of Pt and Rh is attached to a substrate installed at an inner portion of a case of the catalytic converter so as to purify the exhaust gas. Herein, Pt is mainly used for the oxidization action of CO and HC, and Rh is mainly used for the reduction action of Nox.

However, the above catalytic converter may optimally operate only when the mixture having the mixture ratio in the vicinity of the theoretical mixture ratio is burned and exhausted. Thus, the engine must be controlled such that it has the mixture ratio in the vicinity of the theoretical mixture ratio, causing technical problems.

DISCLOSURE OF THE INVENTION

Therefore, the present invention has been made in view of the above-mentioned problems occurring in the prior art, and it is an object of the present invention to provide a low-fuel consumption and low-pollution combustion system for supplying a vehicle engine with a mixture of fuel and oxygen, in which oxygen contained in air is separated from nitrogen through a PSA (pressure swing adsorption) scheme so that oxygen having purity above 95% is obtained and a mixture of fuel and oxygen is fed into a combustion chamber of the vehicle engine and burned in the combustion chamber of the vehicle engine, thereby obtaining a desired engine output with low-fuel consumption, and in which nitrogen ($N_2$) is previously removed so that an amount of nitride oxide (Nox) can be minimized during the combustion procedure and CO and toxic gas derived from incomplete combustion can be minimized by achieving complete combustion.

Another object of the present invention is to provide a low-fuel consumption and low-pollution combustion system for supplying a vehicle engine with a mixture of fuel and oxygen, in which oxygen is used in the process of combustion so that an amount of unburned fuel and inert gas, which does not contribute to combustion, is reduced, thereby maximizing the combustion efficiency, saving fuel by 1 to 3% per 1% of an oxygen enrichment rate in a combustion chamber, and improving the thermal efficiency by increasing the oxygen enrichment rate.

To achieve the above objects, the present invention provides a low-fuel consumption and low-pollution combustion system capable of obtaining a high engine output with low-fuel consumption by reducing toxic gas derived from incomplete combustion through feeding a mixture of oxygen and fuel into a vehicle engine, the low-fuel consumption and low-pollution combustion system comprising: an oxygen separator for separating oxygen contained in air from nitrogen by introducing external air into adsorption towers with predetermined pressure while storing the oxygen separated from the nitrogen in an oxygen storage tank and exhausting the nitrogen an exterior; an intake pipe communicated with the engine so as to feed the oxygen stored in the oxygen storage tank into a combustion chamber of the engine; a first pressure regulator and a first oil/water separator sequentially connected to a transport pipe connecting the intake pipe to the oxygen storage tank, the first pressure regulator transporting the oxygen stored in the oxygen storage tank to the combustion chamber of the engine through the intake pipe while regulating pressure of the oxygen, the first oil/water separator separating water from the oxygen; and a proportional oxygen sensor checking a density of the oxygen passing through the intake pipe and sending a signal thereof to an electronic control unit (ECU), wherein the ECU controls elements of the oxygen separator based on information transmitted thereto from the proportional oxygen sensor to feed the oxygen and fuel into the combustion chamber of the engine with an optimum mixture ratio.

BRIEF DESCRIPTION OF THE DRAWINGS

The foregoing and other objects, features and advantages of the present invention will become more apparent from the following detailed description when taken in conjunction with the accompanying drawings in which.

BEST MODE FOR CARRYING OUT THE INVENTION

Reference will now be made in detail to the preferred embodiments of the present invention.

The structure and operation similar to those of the prior art will not be further described below in order to avoid redundancy.

Figure 1:
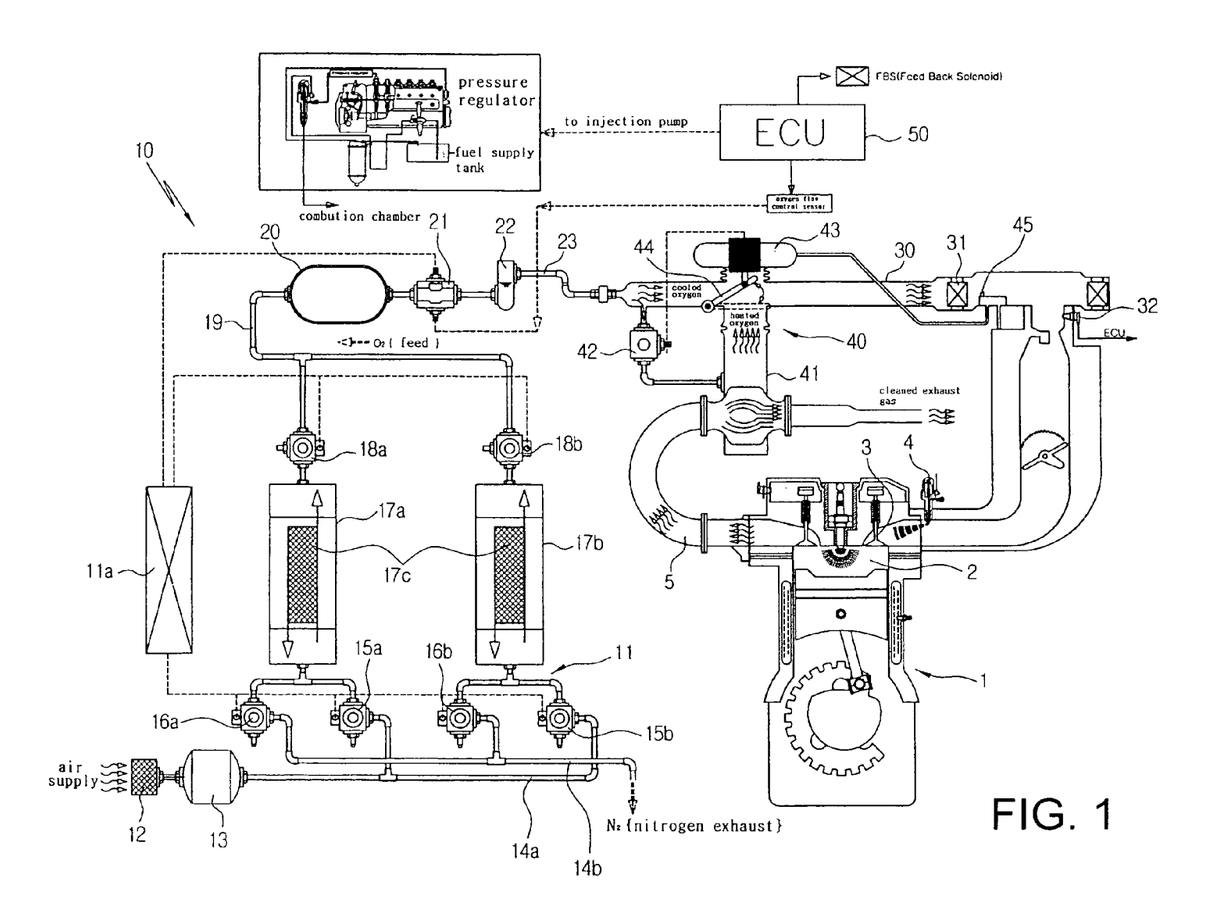
FIG. 1 is a view illustrating a diesel engine equipped with a low-fuel consumption and low-pollution combustion system for supplying a vehicle engine with a mixture of fuel and oxygen according to a first embodiment of the present invention.

FIG. 1 is a view illustrating a diesel engine equipped with a low-fuel consumption and low-pollution combustion system for supplying a vehicle engine with a mixture of fuel and oxygen according to a first embodiment of the present invention.

The low-fuel consumption and low-pollution combustion system 10 for supplying the vehicle engine with the mixture of fuel and oxygen is applicable for a diesel engine system 1, a gasoline engine 1 and an LPG engine 1. Since the structure and operation of each engine 1 are generally known in the art, they will not be further described below.

First, as shown in FIG. 1, according to the low-fuel consumption and low-pollution combustion system 10 applied to the diesel engine 1, intake air supplied from the exterior is absorbed in adsorption towers 17a and 17b with predetermined pressure so as to separate oxygen contained in the intake air from nitrogen. At this time, the oxygen separated from the nitrogen is stored in an oxygen storage tank 20 and the nitrogen is exhausted to the exterior by means of an oxygen separator 11 installed in the vicinity of the diesel engine 1.

The oxygen separator 11 adapted for the diesel engine 1 may separate the oxygen contained in the air from the nitrogen through the PSA (pressure swing adsorption) scheme. Hereinafter, the description will be made in detail with regard to the oxygen separator 11.

The oxygen separator 11 includes an air filter 12 for purifying intake air supplied from the exterior, an air compressor 13 installed at one side of the air filer 12 so as to transport the intake air from the air filter 12 by applying predetermined pressure to the intake air, a plurality of adsorption towers 17a and 17b (only two adsorption towers are shown in FIG. 1) for separating oxygen contained in the intake air having the predetermined pressure from nitrogen, an air transport pipe 14a having check valves 15a and 15b for receiving the intake air and connecting the air compressor 13 to the adsorption towers 17a and 17b, an oxygen feeding pipe 19 having check valves 18a and 18b for exhausting oxygen and connecting the adsorption towers 17a and 17b with the oxygen storage tank 20 so as to transport the oxygen separated from the nitrogen in the adsorption towers 17a and 17b to the oxygen storage tank 20, a nitride exhaust pipe 14b having check valves 16a and 16b for exhausting nitrogen and being connected to the adsorption towers 17a and 17b so as to exhaust the nitrogen separated from the oxygen in the adsorption towers 17a and 17b to the exterior, and an oxygen feeding control unit 11a for controlling the elements of the oxygen separator 11 according to an amount of used oxygen.

That is, the oxygen separator 11 feeds the oxygen required for combustion to the engine 1. To this end, the oxygen separator 11 separates the oxygen contained in the intake air from nitrogen and feeds the oxygen to the engine 1 while exhausting the nitrogen to the exterior. The oxygen separator 11 continuously generates oxygen required for combustion and feeds the oxygen to the engine under the control of the oxygen feeding control unit 11a.

In addition, an intake pipe 30 is connected to the engine 1 so as to feed the oxygen stored in the oxygen storage tank 20 to a combustion chamber 2 of the engine 1.

The intake pipe 30 is communicated with the oxygen storage tank 20 through a transport pipe 23.

In addition, a first pressure regulator 21 and a first oil/water separator 22 are sequentially connected to the transport pipe 23 connecting the intake pipe 30 to the oxygen storage tank 20.

The first pressure regulator 21 transports the oxygen stored in the oxygen storage tank 20 to the combustion chamber 2 of the engine 1 through the intake pipe 30 while constantly regulating pressure of the oxygen fed into the combustion chamber 2 of the engine 1.

The first oil/water separator 22 separates water from the oxygen when the oxygen passes through the transport pipe 23.

In addition, an air cleaner 31 can be connected to the intake pipe 30 so as to feed oxygen to the engine 1 by supplying external air to the engine 1 when the oxygen is insufficient in the process of combustion.

A proportional oxygen sensor 32 is installed at a downstream of the intake pipe 30 so as to check the density of oxygen passing through the intake pipe 30 and sends a signal thereof to an electronic control unit (ECU) 50 controlling the operation of the engine 1.

That is, the proportional oxygen sensor 32 sends information related to the density of oxygen to the ECU 50 in such a manner that the ECU 50 can control the above individual elements based on the information transmitted thereto from the proportional oxygen sensor 32. Thus, the mixture of oxygen and fuel can be fed into the combustion chamber 2 of the engine 1 with an optimum mixture ratio under the control of the ECU 50.

In addition, if the external air is fed into the engine 1 from the air cleaner 31, the ECU 50 proportionally mixes the air with oxygen based on the information transmitted thereto from the proportional oxygen sensor 32, thereby obtaining an optimum combustion condition.

If it is necessary to perform the combustion process with pure oxygen only, the ECU 50 completely shields the air fed from the air cleaner 31 such that only the pure oxygen is fed into the combustion chamber 2 of the engine 1 and is burned with fuel in the combustion chamber 2 of the engine 1.

In addition, an oxygen temperature control unit 40 is connected to the intake pipe 30 so as to improve the combustion efficiency by maintaining the temperature of the oxygen fed into the engine 1 at a constant level regardless of the external environment.

That is, if the oxygen having a constant temperature is fed into the engine regardless of the temperature of external environment, an amount of CO and HC can be minimized.

To this end, the oxygen temperature control unit 40 includes a temperature rise manifold 41 provided at one side thereof with a pressure regulator 42 in order to receive a part of oxygen contained in the intake pipe 30 through the pressure regulator 42 and a lower portion of which is connected to an exhaust manifold 5 of the engine 1 so as to feed heated oxygen to the intake pipe 30 by heating the oxygen transferred thereto from the pressure regulator 42, a control valve 44 for selectively opening/closing an inlet of the temperature rise manifold 41 and an internal passage of the intake pipe 30, and a vacuum controller 43 installed above the control valve 44 of the intake pipe 30 to operate the control valve 44 under the control of a temperature detector 45 which detects the temperature of the oxygen fed through the intake pipe 30.

Therefore, if the temperature of the oxygen is high (above 45° C.), the temperature detector 45 operates the vacuum controller 43 so as to close the inlet of the temperature rise manifold 41 using the control valve 44, thereby feeding cooled oxygen.

In contrast, if the temperature of the oxygen is low (below 5° C.), the temperature detector 45 operates the vacuum controller 43 so as to open the inlet of the temperature rise manifold 41 using the control valve 44, thereby feeding heated oxygen to facilitate complete combustion.

In this manner, the oxygen temperature control unit 40 operates the control valve 44 by controlling the vacuum controller 43 according to the temperature of oxygen in such a manner that the cooled oxygen is properly mixed with heated oxygen, thereby optimizing the temperature of oxygen for complete combustion.

Hereinafter, the operation of the low-fuel consumption and low-pollution combustion system 10 will be described.

First, the adsorption towers 17a and 17b of the oxygen separator 11 alternately generate the oxygen. That is, when one adsorption tower 17a generates the oxygen, the other adsorption tower 17b exhausts the nitrogen to the exterior.

Thus, purified air introduced through the air filter 12 is supplied into the adsorption tower 17a along the air transport pipe 14a with predetermined pressure by means of the air compressor 13. At this time, the adsorption tower 17a is pressed by means of the air having the predetermined pressure and the nitrogen is absorbed in an adsorption agent 17c. In addition, the oxygen may remain in the adsorption tower 17a while maintaining a gaseous state.

Then, as the check valve 18a is opened, the oxygen remaining in the adsorption tower 17a is exhausted to the oxygen storage tank 20 along the oxygen feeding pipe 19. At this time, the check valve 16a of the adsorption tower 17a exhausting the oxygen maintains a closed state.

Meanwhile, as the check valve 16b is opened, the other adsorption tower 17b exhausts the nitrogen, which has been absorbed in the adsorption tower 17b during the previous processes, to the exterior through the nitrogen exhaust pipe 14b. At this time, the check valve 18b of the adsorption tower 17b exhausting the nitrogen maintains a closed state.

In this manner, the adsorption towers 17a and 17b of the oxygen separator 11 continuously generate the oxygen by turns.

After that, the oxygen stored in the oxygen storage tank 20 is fed into the intake pipe 30 through the first pressure regulator 21. At this time, the first oil/water separator 22 connected to the transport pipe 23 connecting the oxygen storage tank 20 with the intake pipe 30 removes water contained in the oxygen.

The oxygen fed into the intake pipe 30 is supplied to the engine 1. At this time, the proportional oxygen sensor 32 checks the density of the oxygen supplied to the engine 1 and sends a signal thereof to the ECU 50. Upon receiving the signal from the proportional oxygen sensor 32, the ECU 50 proportionally mixes the air fed from the air cleaner 31 with oxygen based on the information transmitted thereto from the proportional oxygen sensor 32, thereby obtaining an optimum combustion condition.

If it is necessary to perform the combustion process with pure oxygen only, the ECU 50 completely shields the air fed from the air cleaner 31 such that only the pure oxygen is fed into the combustion chamber 2 of the engine 1 and is burned with fuel in the combustion chamber 2 of the engine 1. In addition, in order to control the temperature of the combustion chamber 2 and the engine speed, the ECU 50 adjusts an amount of oxygen and fuel to be fed into the combustion chamber 2 of the engine 1. At this time, the adsorption towers 17a and 17b continuously generate the oxygen by turns so as to compensate for the oxygen consumed in the engine 1.

Meanwhile, the temperature rise manifold 41 installed at one side of the intake pipe 30 maintains the temperature of oxygen passing through the intake pipe 30 in a constant level corresponding to the temperature of the heated oxygen in order to improve the combustion efficiency. That is, the temperature rise manifold 41 receives a part of oxygen stored in the intake pipe 30 through the pressure regulator 42 installed at one side of the temperature rise manifold 41, heats the oxygen by using heat generated from the exhaust manifold 5 connected to the engine 1, and then feeds the oxygen to the intake pipe 30.

At this time, the control valve 44 for opening/closing the inlet of the temperature rise manifold 41 mixes the cooled oxygen passing through the intake pipe 30 with the heated oxygen fed from the temperature rise manifold 41 under the control of the temperature detector 45 which detects the temperature of the oxygen passing through the intake pipe 30, thereby feeding the oxygen having a constant temperature to the combustion chamber 2 of the engine 1.

That is, the temperature detector 45 controls the operation of the vacuum controller 43 according to the temperature of the oxygen passing through the intake pipe 30. At this time, if the temperature of the oxygen is high (above 45° C.), the temperature detector 45 operates the vacuum controller 43 so as to close the inlet of the temperature rise manifold 41 using the control valve 44, thereby feeding cooled oxygen.

In contrast, if the temperature of the oxygen is low (below 5° C.), the temperature detector 45 operates the vacuum controller 43 so as to open the inlet of the temperature rise manifold 41 using the control valve 44, thereby feeding heated oxygen to facilitate complete combustion.

Figure 2:
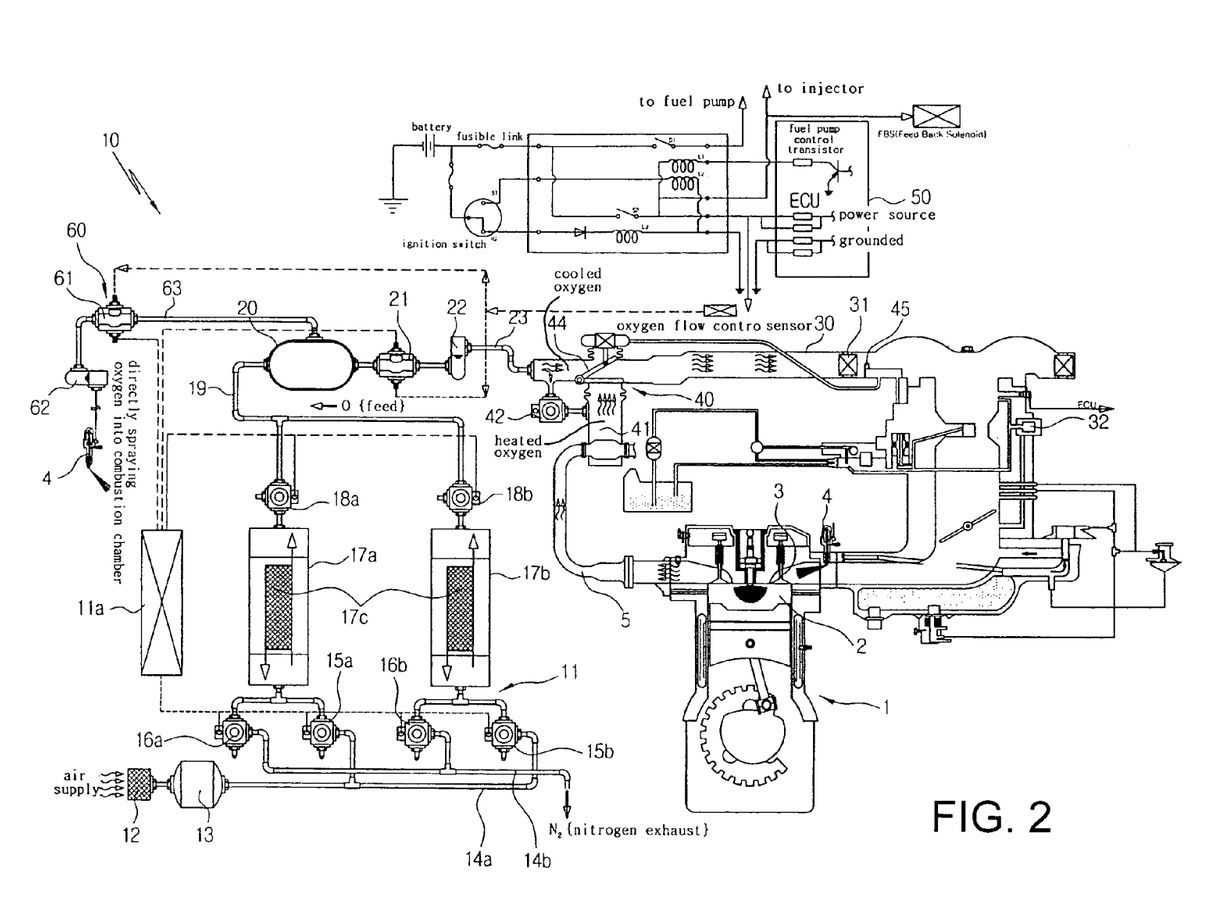
FIG. 2 is a view illustrating a gasoline engine equipped with a low-fuel consumption and low-pollution combustion system for supplying a vehicle engine with a mixture of fuel and oxygen according to a second embodiment of the present invention.

FIG. 2 is a view illustrating a gasoline engine equipped with a low-fuel consumption and low-pollution combustion system for supplying a vehicle engine with a mixture of fuel and oxygen according to a second embodiment of the present invention. The structure and operation of the second embodiment of the present invention is similar to those of the first embodiment of the present invention, so the following description will be focused on different parts therebetween.

As shown in FIG. 2, the low-fuel consumption and low-pollution combustion system 10 according to the second embodiment of the present invention is substantially identical to the low-fuel consumption and low-pollution combustion system 10 according to the first embodiment of the present invention, except that the low-fuel consumption and low-pollution combustion system 10 is applied to the gasoline engine 1 instead of the diesel engine 1.

However, the low-fuel consumption and low-pollution combustion system 10 according to the second embodiment of the present invention further includes a direct spray unit 60 for directly spraying the mixture of fuel and oxygen into the combustion chamber 2 of the engine 1.

The direct spray unit 60 includes an injector 4 installed at an upstream of an intake valve 3 of the engine 1 for simultaneously receiving, mixing and spraying oxygen and fuel, a second pressure regulator 61 connected to the transport pipe 63, which directly connects the oxygen storage tank 20 with the injector 4, in order to directly feed oxygen stored in the oxygen storage tank 20 to the injector 4 while regulating pressure of the oxygen, and a second oil/water separator 62 connected to the transport pipe 63 so as to separate water from the oxygen.

Accordingly, the second pressure regulator 61 directly feeds the oxygen stored in the oxygen storage tank 20 into the injector 4 through the transport pipe 63 and the injector 4 mixes the oxygen with fuel and feeds the mixture to the combustion chamber 2 of the engine 1. At this time, the second oil/water separator 62 removes water from the oxygen before the oxygen passes through the transport pipe 63 by means of the second pressure regulator 61.

In the meantime, an amount of the mixture (oxygen and fuel) to be sprayed and burned is adjusted by means of a feedback solenoid (FBS) under the control of the ECU 50.

Figure 3:
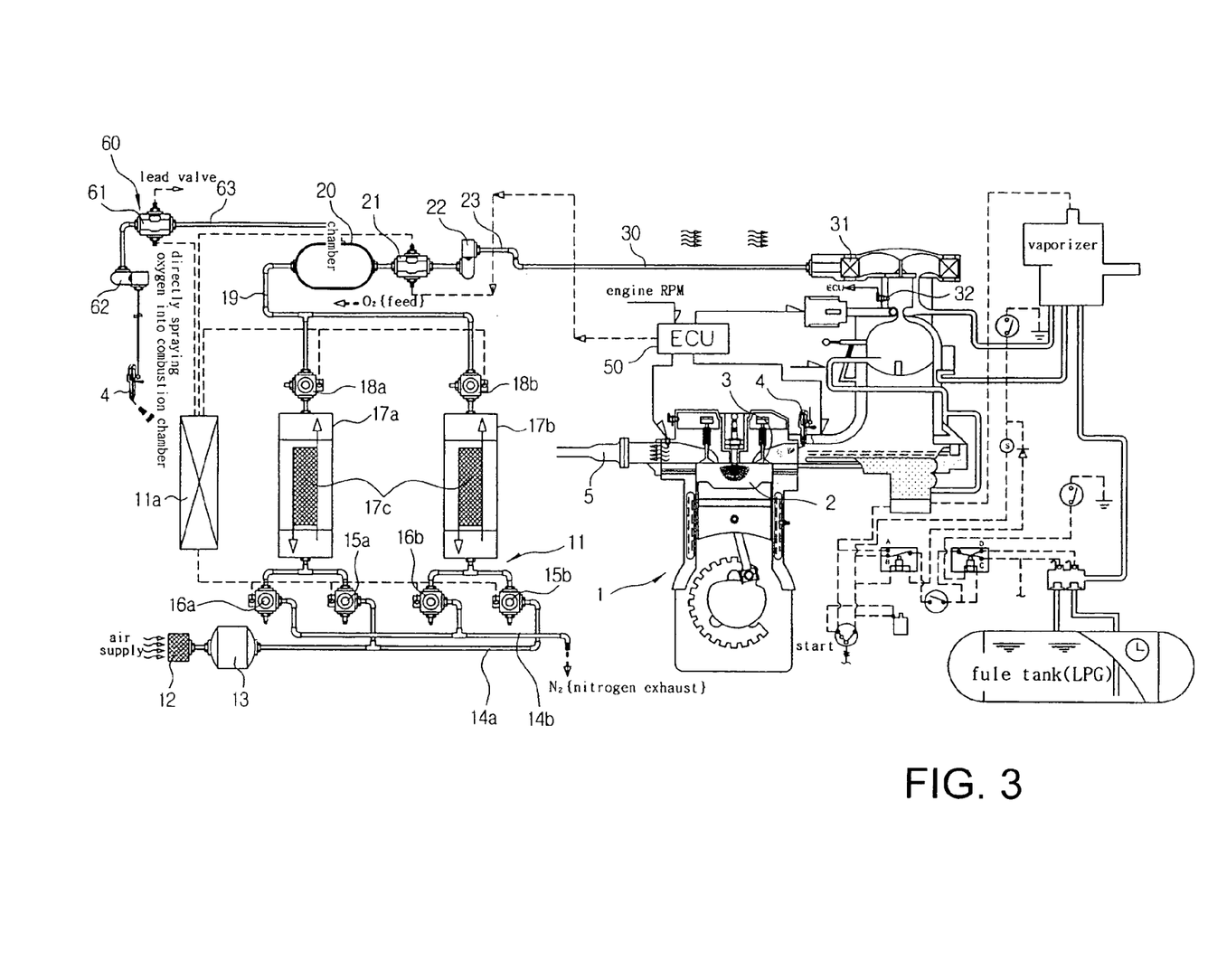
FIG. 3 is a view illustrating an LPG engine equipped with a low-fuel consumption and low-pollution combustion system for supplying a vehicle engine with a mixture of fuel and oxygen according to a third embodiment of the present invention.

FIG. 3 is a view illustrating an LPG engine equipped with a low-fuel consumption and low-pollution combustion system for supplying a vehicle engine with a mixture of fuel and oxygen according to a third embodiment of the present invention. The structure and operation of the third embodiment of the present invention is similar to those of the first and second embodiments of the present invention, so the following description will be focused on different parts therebetween.

As shown in FIG. 3, the low-fuel consumption and low-pollution combustion system 10 according to the third embodiment of the present invention is substantially identical to the low-fuel consumption and low-pollution combustion system 10 according to the second embodiment of the present invention, except that the low-fuel consumption and low-pollution combustion system 10 is applied to the LPG engine 1 instead of the gasoline engine 1.

However, according to the third embodiment of the present invention, the LPG engine 1 may not have the oxygen temperature control unit 40 and selectively have the direct spray unit 60 identical to the direct spray unit 60 described in the second embodiment of the present invention.

Although the structure and operation of the low-fuel consumption and low-pollution combustion system 10 have been described in relation to the diesel engine 1, the low-fuel consumption and low-pollution combustion system 10 of the present invention is also applicable for the gasoline engine 1 and the LPG engine 1. In addition, the present invention is applicable for various engines in addition to vehicle engines.

INDUSTRIAL APPLICABILITY

As can be seen from the foregoing, according to the present invention, oxygen contained in air is separated from nitrogen through a PSA (pressure swing adsorption) scheme so that oxygen having purity above 95% is obtained and a mixture of fuel and oxygen is fed into a combustion chamber of the vehicle engine and burned in the combustion chamber of the vehicle engine, thereby obtaining a desired engine output with low-fuel consumption, and in which nitrogen ($N_2$) is previously removed so that an amount of nitride oxide (Nox) can be minimized during the combustion procedure and CO and toxic gas derived from incomplete combustion can be minimized by achieving complete combustion, thereby reducing environmental pollution.

In addition, the oxygen is used in the process of combustion so that an amount of unburned fuel and inert gas, which does not contribute to combustion, is reduced, thereby maximizing the combustion efficiency, saving fuel by 1 to 3% per 1% of an oxygen enrichment rate in the combustion chamber, and improving the thermal efficiency by increasing the oxygen enrichment rate.

Furthermore, the present invention can constantly feed heated oxygen regardless of external environment, so that an amount of CO and HC can be minimized and the combustion efficiency can be improved.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

The invention claimed is:

1. A low-fuel consumption and low-pollution combustion system capable of obtaining a high engine output with low-fuel consumption by reducing toxic gas derived from incomplete combustion through feeding a mixture of oxygen and fuel into a vehicle engine 1, the low-fuel consumption and low-pollution combustion system comprising:

an oxygen separator 11 for separating oxygen contained in air from nitrogen by introducing external air into adsorption towers 17a and 17b with predetermined pressure while storing the oxygen separated from the nitrogen in an oxygen storage tank 20 and exhausting the nitrogen an exterior;

an intake pipe 30 communicated with the engine 1 so as to feed the oxygen stored in the oxygen storage tank 20 into a combustion chamber 2 of the engine 1;

a first pressure regulator 21 and a first oil/water separator 22 sequentially connected to a transport pipe 23 connecting the intake pipe 30 to the oxygen storage tank 20, the first pressure regulator 21 transporting the oxygen stored in the oxygen storage tank 20 to the combustion chamber 2 of the engine 1 through the intake pipe 30 while regulating pressure of the oxygen, the first oil/water separator 22 separating water from the oxygen;

an oxygen temperature control unit 40 connected to the intake pipe 30 so as to improve a combustion efficiency by maintaining the temperature of the oxygen fed into the engine 1 at a constant level regardless of external environment, wherein the oxygen temperature control unit 40 includes:

a temperature rise manifold 41 provided at one side thereof with a pressure regulator 42 in order to receive a part of oxygen contained in the intake pipe 30 through the pressure regulator 42 and a lower portion of which is connected to an exhaust manifold 5 of the engine 1 so as to feed heated oxygen to the intake pipe 30 by heating the oxygen transferred thereto from the pressure regulator 42, a control valve 44 for selectively opening/closing an inlet of the temperature rise manifold 41 and an internal passage of the intake pipe 30, and a vacuum controller 43 installed at one side of the intake pipe 30 in order to operate the control valve 44 under a control of a temperature detector 45 which detects a temperature of the oxygen in the intake pipe 30; and a proportional oxygen sensor 32 checking a density of the oxygen passing through the intake pipe 30 and sending a signal thereof to an electronic control unit (ECU) 50, wherein the ECU 50 controls the above individual elements based on information transmitted thereto from the proportional oxygen sensor 32 to feed the oxygen and fuel into the combustion chamber 2 of the engine 1 with an optimum mixture ratio.

2. The low-fuel consumption and low-pollution combustion system as claimed in claim 1, wherein the oxygen separator 11 includes an air filter 12 for purifying the external air supplied thereto from the exterior, an air compressor 13 installed at one side of the air filter 12 so as to transport the air from the air filter 12 by applying predetermined pressure to the air, a plurality of adsorption towers 17a and 17b for separating the oxygen contained in the air having the predetermined pressure from the nitrogen, an air transport pipe 14a having check valves 15a and 15b for receiving the air and connecting the air compressor 13 to the adsorption towers 17a and 17b, an oxygen feeding pipe 19 having check valves 18a and 18b for exhausting the oxygen and connecting the adsorption towers 17a and 17b with the oxygen storage tank 20 so as to transport the oxygen separated from the nitrogen in the adsorption towers 17a and 17b to the oxygen storage tank 20, a nitride exhaust pipe 14b having check valves 16a and 16b for exhausting the nitrogen and being connected to the adsorption towers 17a and 17b so as to exhaust the nitrogen separated from the oxygen in the adsorption towers 17a and 17b to the exterior, and an oxygen feeding control unit 11a for controlling the elements of the oxygen separator 11 according to an amount of used oxygen.

3. The low-fuel consumption and low-pollution combustion system as claimed in claim 1, further comprising an air cleaner 31 connected to the intake pipe 30 so as to feed the oxygen to the engine 1 by supplying the external air to the engine 1 when the oxygen is insufficient in the process of combustion.

4. The low-fuel consumption and low-pollution combustion system as claimed in claim 1, further comprising a direct spray unit 60 for directly spraying the mixture of fuel and oxygen into the combustion chamber 2 of the engine 1.

5. The low-fuel consumption and low-pollution combustion system as claimed in claim 4, wherein the direct spray unit 60 includes an injector 4 installed at an upstream of an intake valve 3 of the engine 1 for simultaneously receiving, mixing and spraying oxygen and fuel, a second pressure regulator 61 connected to a transport pipe 63 which directly connects the oxygen storage tank 20 with the injector 4, in order to directly feed oxygen stored in the oxygen storage tank 20 to the injector 4 while regulating pressure of the oxygen, and a second oil/water separator 62 connected to the transport pipe 63 so as to separate water from the oxygen.

6. A low-fuel consumption and low-pollution combustion system capable of obtaining a high engine output with low-fuel consumption by reducing toxic gas derived from incomplete combustion through feeding a mixture of oxygen and fuel into a vehicle engine 1, the low-fuel consumption and low-pollution combustion system comprising:

an oxygen separator 11 for separating oxygen contained in air from nitrogen by introducing external air into adsorption towers 17a and 17b with predetermined pressure while storing the oxygen separated from the nitrogen in an oxygen storage tank 20 and exhausting the nitrogen an exterior;

an intake pipe 30 communicated with the engine 1 so as to feed the oxygen stored in the oxygen storage tank 20 into a combustion chamber 2 of the engine 1;

a first pressure regulator 21 and a first oil/water separator 22 sequentially connected to a transport pipe 23 connecting the intake pipe 30 to the oxygen storage tank 20, the first pressure regulator 21 transporting the oxygen stored in the oxygen storage tank 20 to the combustion chamber 2 of the engine 1 through the intake pipe 30 while regulating pressure of the oxygen, the first oil/water separator 22 separating water from the oxygen; and a proportional oxygen sensor 32 checking a density of the oxygen passing through the intake pipe 30 and sending a signal thereof to an electronic control unit (ECU) 50, wherein the ECU 50 controls the above individual elements based on information transmitted thereto from the proportional oxygen sensor 32 to feed the oxygen and fuel into the combustion chamber 2 of the engine 1 with an optimum mixture ratio;

a direct spray unit 60 for directly spraying the mixture of fuel and oxygen into the combustion chamber 2 of the engine 1, wherein the direct spray unit 60 includes an injector 4 installed at an upstream of an intake valve 3 of the engine 1 for simultaneously receiving, mixing and spraying oxygen and fuel, a second pressure regulator 61 connected to a transport pipe 63 which directly connects the oxygen storage tank 20 with the injector 4, in order to directly feed oxygen stored in the oxygen storage tank 20 to the injector 4 while regulating pressure of the oxygen, and a second oil/water separator 62 connected to the transport pipe 63 so as to separate water from the oxygen.

* * * * *